(No Model.)
R. G. A. MEIER.
TOASTER.
No. 567,108.    Patented Sept. 1, 1896.
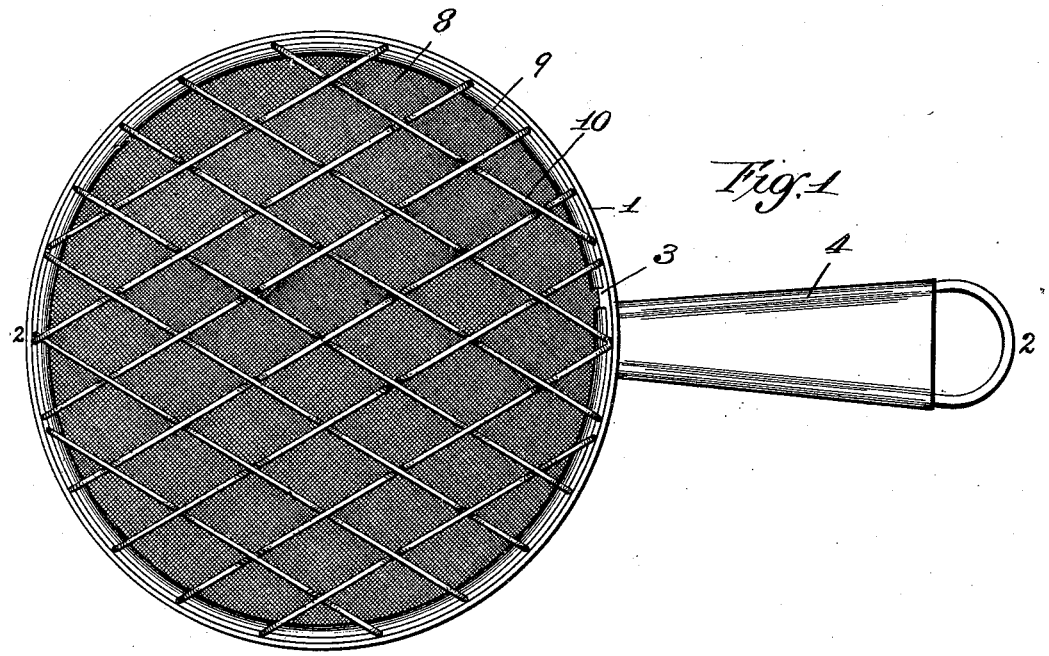
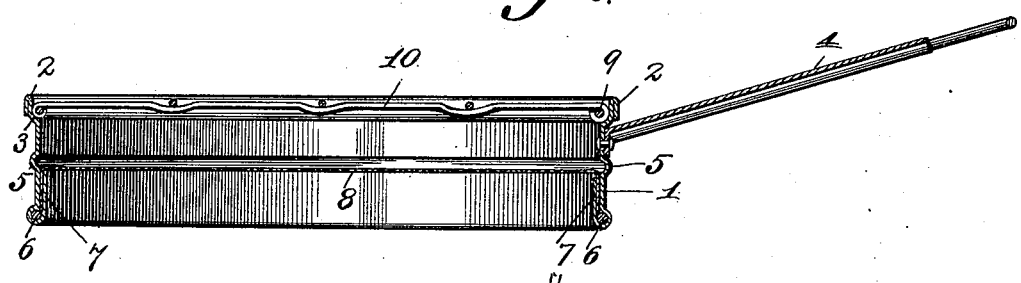
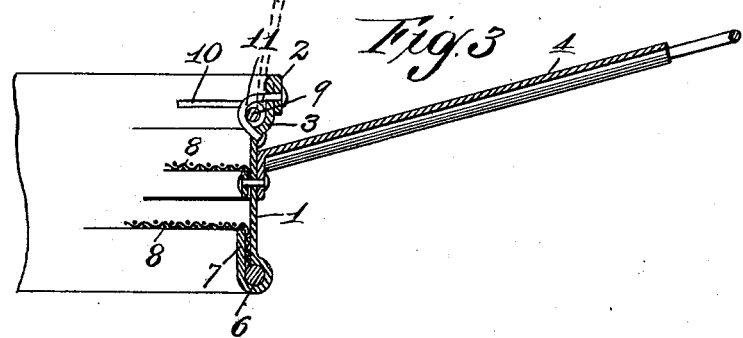

UNITED STATES PATENT OFFICE.

ROBERT G. A. MEIER, OF ST. LOUIS, MISSOURI, ASSIGNOR, BY DIRECT AND MESNE ASSIGNMENTS, TO THE CRESCENT NOVELTY MANUFACTURING COMPANY, OF SAME PLACE.

TOASTER.

SPECIFICATION forming part of Letters Patent No. 567,108, dated September 1, 1896.

Application filed January 7, 1896. Serial No. 574,659. (No model.)

*To all whom it may concern:*

Be it known that I, ROBERT G. A. MEIER, of the city of St. Louis, State of Missouri, have invented certain new and useful Improvements in Toasters, of which the following is a full, clear, and exact description, reference being had to the accompanying drawings, forming a part hereof.

My invention relates to an improved toaster; and it consists in the novel features of construction hereinafter described and claimed.

In the drawings, Figure 1 is a top plan view of my improved toaster. Fig. 2 is a longitudinal sectional view taken approximately on the indicated line 2 2 of Fig. 1. Fig. 3 is an enlarged detail sectional view of a modified form of my improved toaster.

Referring by numerals to the accompanying drawings, 1 indicates the body of the toaster, the same being constructed of sheet metal and in the form of a ring or circular wall the upper edge 2 of which is beaded, and an annular shoulder or offset 3 is formed immediately below said beaded upper edge.

4 indicates the handle, which may be of any suitable form, and said handle is secured to the outside of the body of the toaster and extends from thence upwardly and outwardly. Formed at a point midway between the top and bottom edges of the body of the toaster is an annular bead 5. The lower edge of the body of the toaster is wired, as indicated by 6, and a portion of material 7 extends upwardly from said wired edge, terminating at the bead 5.

8 indicates a section of fine wire-mesh or analogous material that is horizontally arranged at a point midway between the top and bottom edges of the body of the toaster, the edges of said section being turned downwardly and interposed between the ring or wall of the body and the upturned portion 7.

9 indicates an expansible ring of wire or analogous material, to which is secured the edge of a section of open wire-mesh 10, and said ring carrying said section of wire-mesh, when slightly contracted, readily fits within the top of the body of the toaster and rests upon the annular shoulder or offset 3.

In the modification shown in Fig. 3 a pair of the sections of fine wire-mesh 8 is shown, and the ring 9, carrying the section of wire-mesh 10, is shown attached to the ring or wall of the toaster by means of a loop 11. By this construction said ring 9 is hinged to the toaster and the section of wire-mesh 10 may be swung into a vertical plane, as indicated by dotted lines in Fig. 3.

In the practical use of my improved device the body of the toaster is located directly over the flame of the stove or other cooking apparatus and the bread or article to be toasted is located directly upon the section of wire-mesh 10. The flame will strike the section of wire-mesh 8 and by the same be diffused over its entire surface, and said flame, if not too strong, will not pass through said mesh. In this manner all of the heat from the flame will be utilized in toasting the bread or other article located upon the section of wire-mesh 10, yet the flame will not contact with said article. A toaster for use upon a large or strong flame is provided with two of the sections of wire-mesh 8, this being found sufficient in all cases to thoroughly break and diffuse larger and stronger flames. In this construction the ring 9 and section of mesh 10 are hinged to the frame of the toaster in order that access may be had to the top section of wire-mesh 10 without entirely removing the ring and section of mesh 10 from the toaster.

A toaster so constructed is simple, strong, and durable, very efficient in use, is easily cleaned, and can be used for toasting almost any article desired.

I claim—

A toaster comprising the body portion 1, constructed of sheet metal and in the form of a circular wall, the upper edge 2 being beaded and having an annular offset 3 formed immediately below said beaded upper edge, the handle 4 secured to the outside of the said body and extending from thence upwardly and outwardly, the annular bead 5 formed midway between the top and bottom edges of said body portion, the wire 6 on the lower edge of said body, the portion 7 of material extending upwardly from said wired edge, and terminating at the said bead 5, the fine wire-mesh 8 horizontally arranged at a point midway between the top and bottom edges of the said body and having its edges turned downwardly and interposed between the said body portion 1 and the upturned portion 7, the open wire-mesh 10, and the expansible ring of wire 9 to which is secured the edge of said mesh 10, said ring when slightly contracted fitting within the top of the said body 1 and resting upon the annular offset 3, all arranged substantially as and for the purposes stated.

In testimony whereof I affix my signature in presence of two witnesses.

ROBERT G. A. MEIER.

Witnesses:
 EDWARD EVERETT LONGAN,
 MAUD GRIFFIN.